C. VAN BLAADEREN.
BUOYANT SAFE.
APPLICATION FILED DEC. 13, 1913.
1,188,514.
Patented June 27, 1916.
8 SHEETS—SHEET 1.
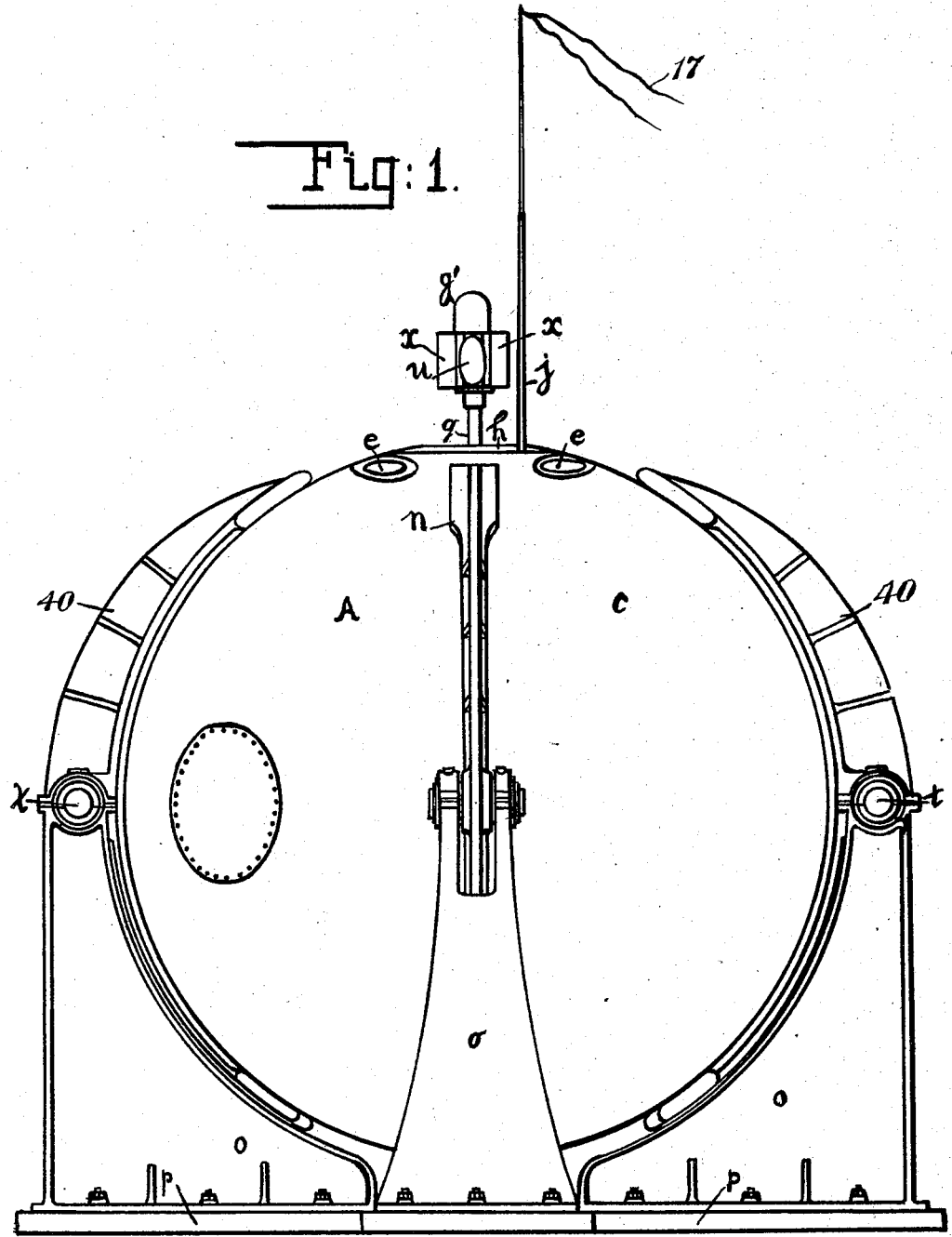
Fig: 1.
WITNESSES:
John C. Sanders
Albert F. Heuman
INVENTOR
Cornelis van Blaaderen
BY M. Wallace White
ATTY

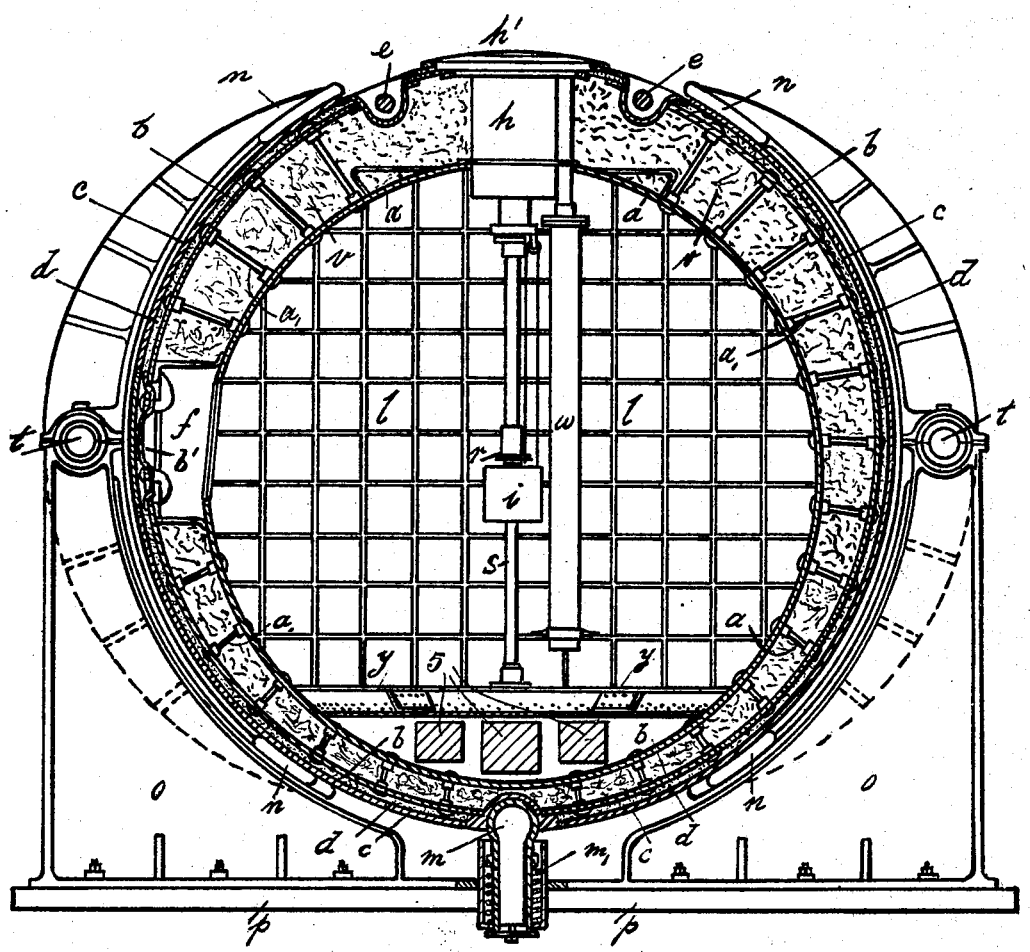

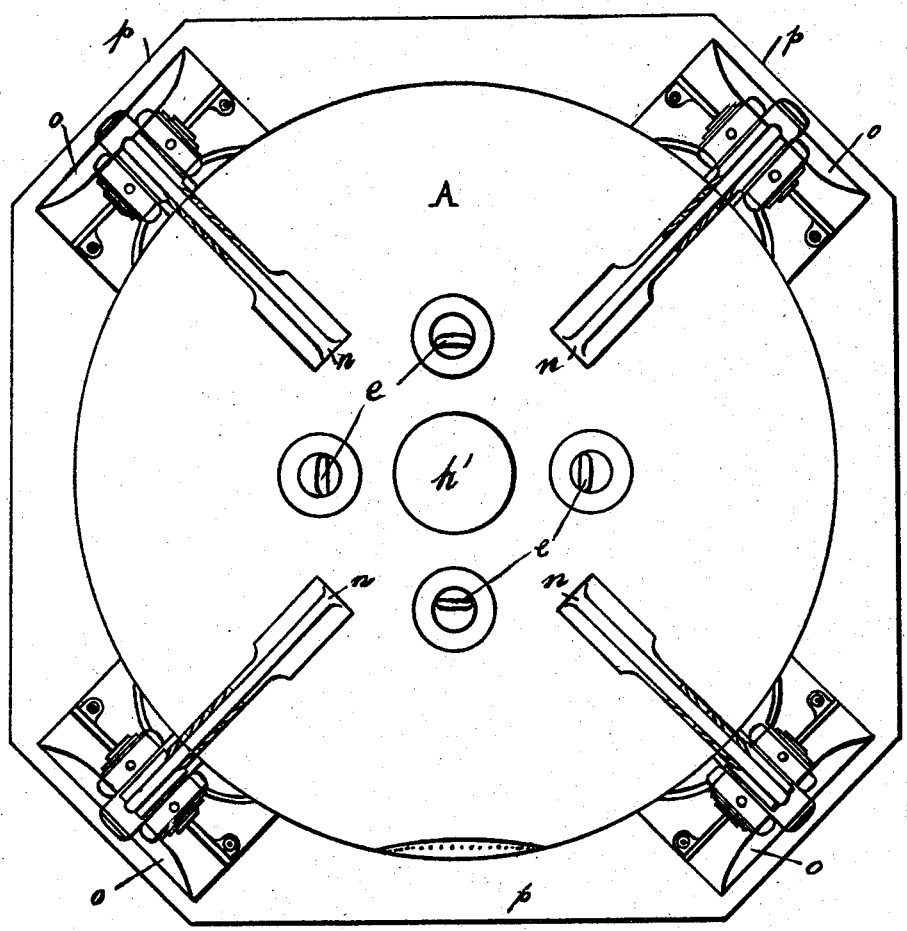

C. VAN BLAADEREN.
BUOYANT SAFE.
APPLICATION FILED DEC. 13, 1913.
1,188,514.  Patented June 27, 1916.
8 SHEETS—SHEET 4.
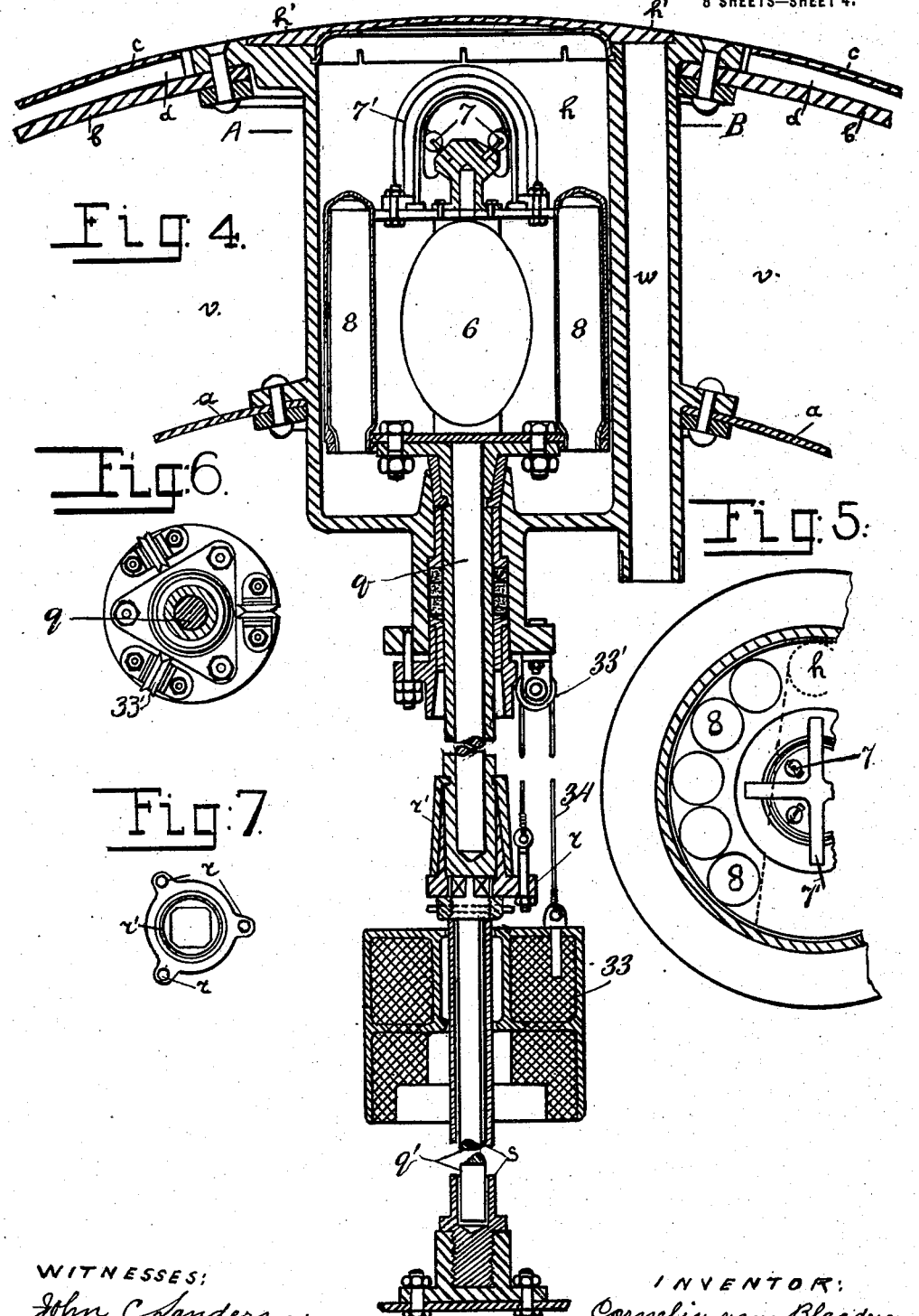

C. VAN BLAADEREN.
BUOYANT SAFE.
APPLICATION FILED DEC. 13, 1913.
1,188,514.
Patented June 27, 1916.
8 SHEETS—SHEET 5.
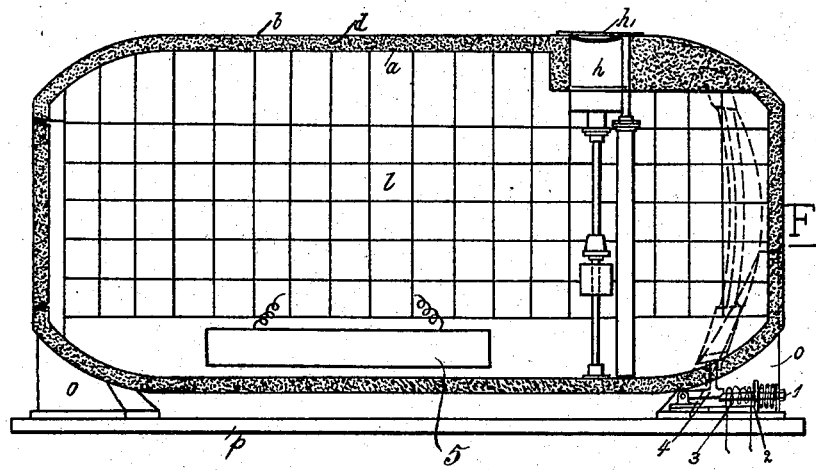
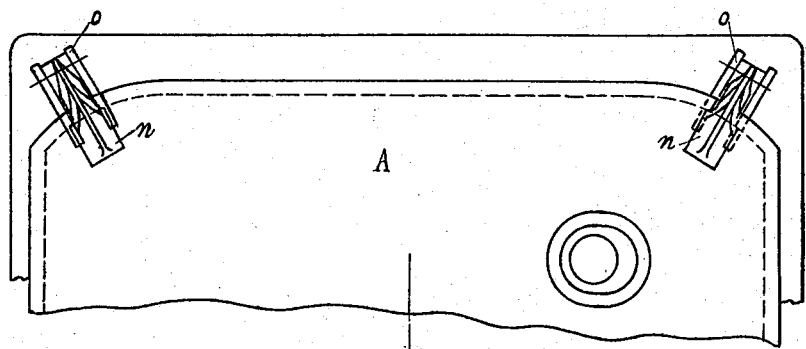
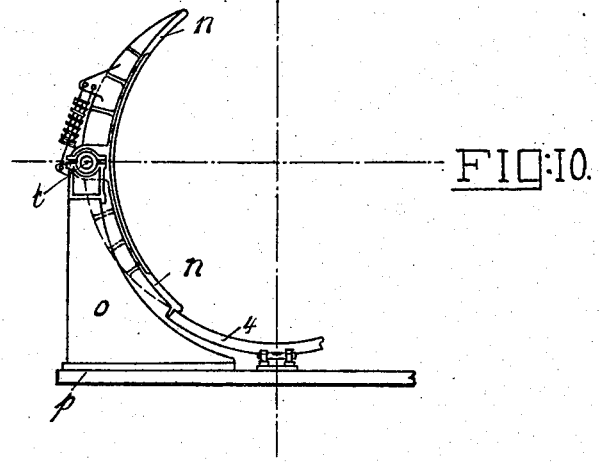

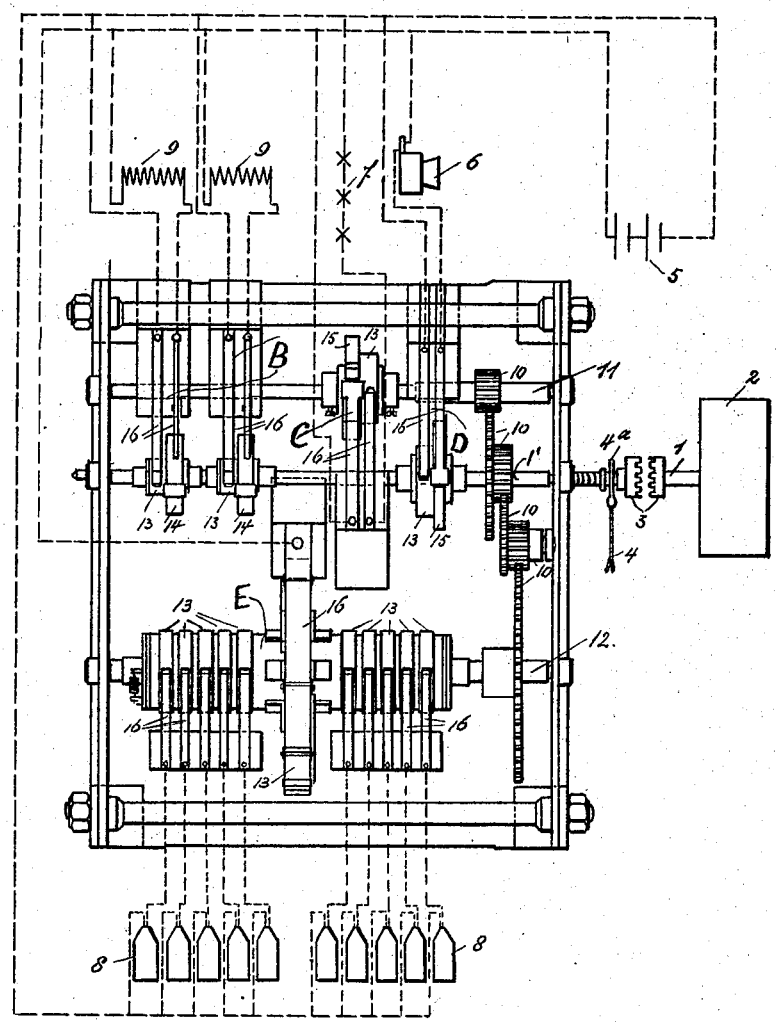

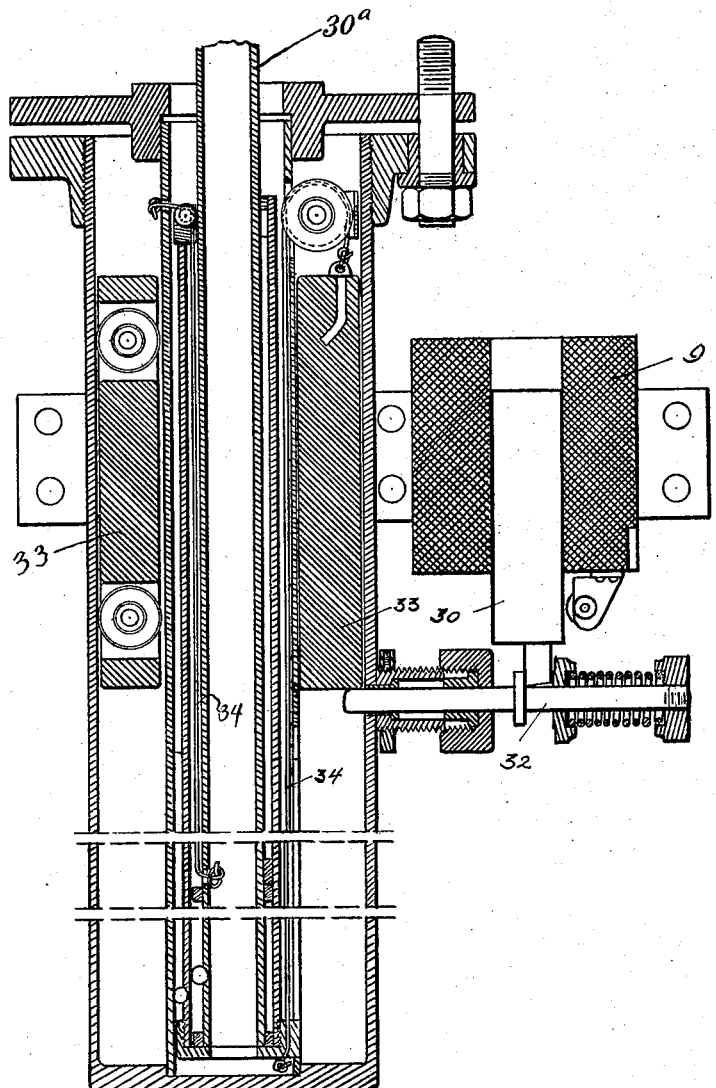

C. VAN BLAADEREN.
BUOYANT SAFE.
APPLICATION FILED DEC. 13, 1913.

1,188,514.

Patented June 27, 1916.
8 SHEETS—SHEET 8.

Inventor:
Cornelis van Blaaderen
By Wm Wallace White
Attorney.

UNITED STATES PATENT OFFICE.

CORNELIS van BLAADEREN, OF SEATTLE, WASHINGTON.

BUOYANT SAFE.

1,188,514.  Specification of Letters Patent.  Patented June 27, 1916.

Application filed December 13, 1913. Serial No. 806,386.

*To all whom it may concern:*

Be it known that I, CORNELIS VAN BLAADEREN, a subject of the Queen of the Netherlands, residing at 609 Ninth avenue, Seattle, Washington, have invented new and useful Improvements in Buoyant Safes, of which the following is a specification.

The present invention relates to an apparatus for transporting valuables, such as large quantities of gold, etc., in a safe manner, and is particularly adapted for use in marine transportation.

The object of the invention is to provide such an apparatus as above mentioned, which will float upon the surface of the water, and which is compact in construction and effective for the purpose for which it is used.

The invention consists in providing a buoyant safe for valuables, equipped with suitable signals, such as rockets, signal lamps and audible signals which are brought into operation when the safe is floated.

A further feature consists in making the safe both heat and burglar proof.

Another and more important feature resides in the provision of means for securing the safe to the deck of a vessel and to automatically release the safe when the vessel sinks, to allow the same to free itself from the vessel. Also the provision of an electric system for controlling the operation of the different signal devices and locking means, which system is made effective through the sinking of the vessel, as will be hereinafter more fully described.

A still further feature consists in the provision of suitable means to receive Hertzian waves from a nearby vessel, which waves will effect the discharge of said rockets.

With the foregoing in view the invention consists in a certain combination and arrangement of parts, hereinafter set forth and more fully described, it being understood however, that changes in the precise construction may be resorted to which fall within the legitimate scope of the invention, as set forth in the appended claims.

Figure 13:
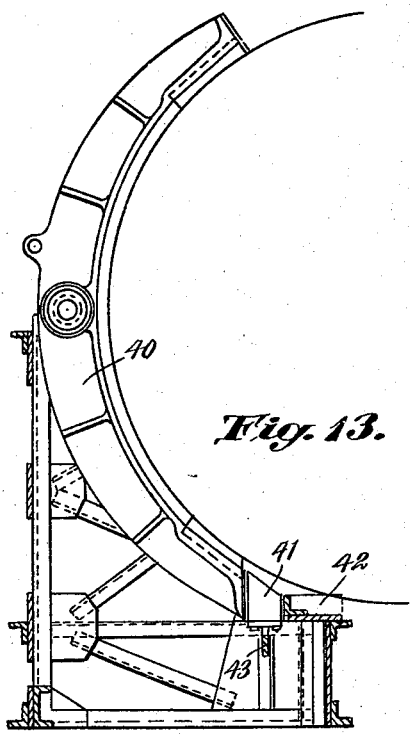
Figure 14:
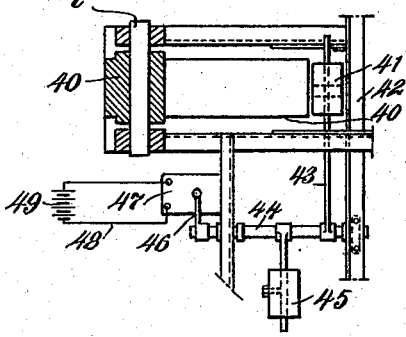
Figure 15:
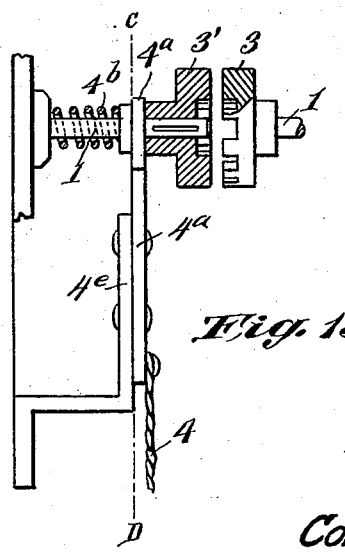
Figure 16:
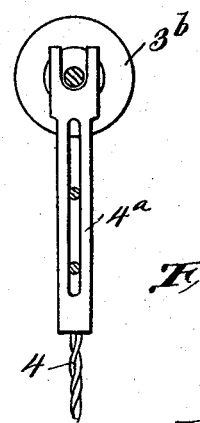

In the drawings: Figure 1 is an elevation of the apparatus, forming the invention, and showing some of the signaling devices projected therefrom; Fig. 2 is a vertical sectional view through the apparatus illustrated in Fig. 1, and showing the signal means folded or collapsed within the safe; Fig. 3 is a plan view of the invention; Fig. 4 is a fragmentary sectional view of the safe illustrating in enlarged view the signal apparatus and the means for projecting the same; Fig. 5 is a fragmentary plan view taken on line A—B of Fig. 4; Figs. 6 and 7 are detail plan views of certain parts of Fig. 4; Fig. 8 shows a modified construction of the safe; Fig. 9 is a fragmentary plan of Fig. 8; Fig. 10 is a side elevation of one of the locking means for securing the safe to the vessel; Fig. 11 is a diagram of the electric system for controlling the operation of the signal devices of the invention, and also illustrates means for rendering said system effective; Fig. 12 is a detail sectional view of the projecting apparatus showing the same connected with a modified construction of the projecting rod for the signaling devices; Figs. 13 and 14 are enlarged detail views of one of the safe-securing means; Fig. 15 is a side elevation of the slidable fork associated with the clutch mechanism for the time controlling device; and, Fig. 16 is an elevation of the same taken on a plane at right angles to the plane of Fig. 15.

Like reference characters referred to in the specification denote similar or like parts on the drawings.

Referring to the drawings, A denotes a safe preferably of a spherical or globe form and having the center of gravity lower than the central point or line so that it may float in a vertical position. The safe is supported in position upon the deck of a vessel in the seat $o$ which is firmly fixed with the bed-plate $p$ the latter being secured to the deck. The construction of the safe comprises an inner and outer steel shell $a$ and $b$ respectively spaced apart by the heat insulating material $v$ and which are held together in position by the connecting-rods $a'$. The heat insulating material $v$ is to be of a suitable thickness as clearly shown in Fig. 2 of the drawings. The outer shell $b$ of the safe is covered or surrounded with electrical insulating material $d$ to prevent electrical contact between the outer shell $b$ and the outer copper covering $c$, which latter finally envelops the whole safe.

In order to hold the safe upon the seat $o$ and to prevent the same from being washed off of the deck by a rough sea, although to permit the safe to became released from the seat when the vessel is sinking, an automatic locking device is provided which comprises a plurality of levers 40 pivoted to the seat $o$, on the shaft $t$, and adapted to conform to the shape of the safe. These levers preferably take a semi-circular or arc formation and are pivoted slightly above the lower half thereof. To lock these levers 40 in a position to secure the safe upon the seat, a latch member 41 is disposed in the seat $o$ and is adapted to engage the lower end of the levers 40 and thus prevent the rotation of the levers about the shaft $t$.

A shaft 44 is connected to the latch 41 by the connecting lever 43 (see Fig. 14) which is rigid with the shaft. A counter-weight 45 is extended from the shaft 44 diametrically opposite to the latch 41, to rotate same and thereby move the latch out of engagement with the lower ends of the levers 40. An electro-magnet 47, normally energized by the battery 49 through the circuit 48, attracts the lever armature 46 to counteract the rotation of the shaft 44 caused by the counter-weight 45, and thereby holds the latch 41 in engagement with the locking lever 40 which will retain the safe upon the seat $o$ in a locked position. The electric circuit 48 is so disposed and connected on the vessel that when the latter begins to sink the electro-magnet is short-circuited and releases the armature 46 whereupon the counter-weight 45 moves the latch 41 from engagement with the locking levers 40, and thus allows the latter to swing about their axes $t$ and release the same.

In order to prevent rotation of the safe in its seat, a depressible pawl $m$ is mounted within a socket in the bed-plate $p$ directly beneath the safe. The upper end of this pawl is adapted to be retained in engagement within a recess in the bottom of the safe normally by means of a spring $m'$.

The safe is provided in the upper portion of the wall thereof with a recess or compartment $h$, normally covered by the cap-piece $h'$, to house the signal apparatus, which is mounted upon a rod $q$. The rod $q$ passes in a watertight manner through the bottom of the compartment $h$ and is rigidly connected with another rod $q'$ slidably mounted in a tube $s$ fixed to the base plate $v$ of the safe. The signal apparatus is adapted to automatically appear when the safe is floated, but only after a predetermined time so that the same may become free of the vessel before projecting its signal apparatus, thus avoiding the possibility of said apparatus becoming entangled or engaged with parts of the vessel. In this particular instance the apparatus is projected by the means of a counterweight 33 which surrounds a tube $s$ and which is connected to the lower end $r$ of the sleeve $r'$ fixed to the rod $q$ by means of a cable 34 passed over the pulley 33'. The counter-weight is normally locked by means of a pawl 32, as shown in Fig. 12, which is controlled by the magnet 9, and which holds the weight in a position so as to allow the apparatus to remain housed in the compartment $h$.

When the safe leaves the seat $o$ the latter pulls on a cable 4, see Fig. 11, which operates the slidable fork or cam 4$^a$ which moves the heads of the clutch members 3 into engagement. One portion of the clutch member is secured to the shaft 1 of a time controlling mechanism 2, while the other portion of the clutch is connected with the shaft 1', which controls the electric circuits of the battery 5. Said circuits are connected with and are adapted to operate the signal mechanism and energize the magnet 9. As before stated, the safety of the safe depends upon the manner in which the safe leaves the vessel. Therefore, a time mechanism 2 is provided to control the operation of the signal apparatus, and whereby the pawl 32 is drawn from engagement with the weight 33, only after a certain period of time has elapsed.

The signal apparatus (Fig. 4) comprises one or more signal lamps 7 surrounded by the protected lenses 7', an electric fog-horn 6 and a plurality of rockets 8, all arranged and supported on the rod $q$. There is also provided a pole $j$ equipped with a telegraphic receiving wire 17 connected with the wiring of the battery 5, which controls the discharge of the rockets 8. The pole $j$ is normally housed in the passageway $w$ and is, preferably, projected out of the safe at the same time with the signal apparatus.

A predetermined time after the cable 4 has been broken and the shafts 1 and 1' have been connected by the clutch heads 3, the time mechanism 2 will rotate the shafts 1 and 1', and by means of the gears 10 the shafts 11 and 12 are likewise rotated to throw the switches B, C, D and E into operation which control the circuits of the battery 5. These switches comprise the collector-rings 13 and the disks 14 and 15 which engage with the contact springs 16, see Fig. 11. In the circuits of the battery 5, as will be seen from Fig. 11, are disposed the magnets 9 controlling the pawl 32 (see Fig. 12), the fog-horn 6, the signal lamps 7 and the rockets 8. So it will be seen that after a predetermined time the magnets 9 will become energized through the operation of the switches B and draw the core 30 out of engagement with the dog 32 which in turn releases the counter-weight 33 whereby the signal apparatus 6, 7 and 8 are projected out of the safe. At the same time the switches C and D are operating and thus cause the operation of the electric fog-horn 6 and signal lamps 7. The electrical connection of the signal lamp switches C with the time mechanism is such that the signal lamps will only burn at night. The switch establishes and interrupts the connection with the battery 5 according to the operation of the time-mechanism, thereby saving all of the current possible by avoiding the unnecessary burning of the lamps.

The switches E of the rocket controlling circuits are of such a construction as to coöperate upon the reception of an electrical impulse through Hertzian waves which are received by the receiving wire on the pole $j$. These Hertzian waves are discharged by a nearby vessel and when received by the apparatus of the present invention operate upon the switches E to send off the rockets 8 so as to attract the attention of the passing vessel.

The interior of the safe A is provided with a plurality of shelves and drawers as indicated by $l$ and with the floor or base plate $y$. The storage battery 5, above referred to, is preferably disposed in the space $k$ below the floor $y$. Access may be had to the interior of the safe through a man-hole $f$ which is formed in the interior wall $a$ and is closed by a suitable door provided with a combination lock mechanism. The man-hole is also provided with an outer door $b'$ suitably bolted or secured to the outer wall of the safe. The apparatus may be also provided on its outer surface with a plurality of sunken handles $e$ which will permit the device to be handled.

Fig. 12 illustrates a modified form of a projecting rod for the signal devices housed within the compartment $h$. This modified construction consists of a collapsible or telescopic rod $30^a$, each section being opened or extended by the dropping of the counterweight 33 when the latter is released from its normal position by the pawl 32. The spring pawl 32 is normally forced outwardly by a spring surrounding the same. However when the apparatus is set the core 30 of the electro-magnet 9 engages with the pawl 32 and holds the same in the path of the counter-weight 33. When the electromagnet is energized and the core 30 attracted the pawl 32 is freed and moves outwardly from the path of the counter-weight 33 which falls by gravity causing the projecting rod $30^a$ to be extended, through the medium of the cable 34, and the signal apparatus projected out of the safe.

In Fig. 8 is shown a modified form of the invention wherein the safe of a substantially cylindrical formation is provided. This cylindrical safe is held upon the seat $o$ by a plurality of pivoted levers $n$, as above mentioned. One or more of these levers are held by a yielding pin 1 slidably mounted in the frame 2 and is held in locking relation to the pivoted catch 4 by means of the electromagnet 3, the catch 4 engaging a recess in the lever $n$. When the vessel sinks, the magnet will become deënergized, as before described. Hence the pin will release the latch 4 which will drop by gravity out of the recess in said lever. To prevent the safe from turning about on a horizontal axis owing to heavy seas and other influences, there is provided in the base plate $p$ a head $m$ which is yieldingly held in engagement with the wall of a suitable recess in the safe, by means of a spring $n$, as may be seen from Fig. 1.

Having described the invention what I claim as new and desire to secure by Letters Patent is set forth in the appended claims:

1. In a floating safe of the character described, in combination, a body, signaling apparatus normally positioned within said body, and means within said body for automatically projecting said apparatus out of said body.

2. In a floating safe of the character described, in combination, a body, electrical signaling apparatus, a switch controlling said apparatus and a time-mechanism for opening and closing the switch.

3. In a floating safe of the character described, in combination, a body, signaling apparatus normally positioned therein, means for projecting said apparatus out of said body, a locking member normally locking said projecting means against action, and time controlled means for releasing said locking member.

4. In a device of the character described, in combination, a floating safe, and means for retaining it on a ship's deck, said means comprising a seat provided with upwardly extending supports, and arms pivotally attached to said supports and adapted to engage the safe when positioned upon said seat, said arms being rotatable about their pivots in a vertical plane.

5. In a device of the character described, in combination, a floating safe, and means for retaining it on a ship's deck, said means comprising a seat, arms pivotally attached to said seat and adapted to engage the safe when positioned upon said seat, locking means normally holding one or more of said arms against rotation, and means actuated by the sinking of the ship to render said locking means inoperative.

6. In a device of the character described, in combination, a floating safe having a recess in the wall thereof, a seat for retaining it upon a ship's deck, and means for locking said safe against rotation about its horizontal axis while positioned in said seat comprising a pawl on said seat yieldingly held in the recess of said safe.

7. A floating safe to be carried by vessels comprising a body, signaling apparatus normally positioned within said body, means within said body for automatically projecting said apparatus without the same, and means for causing said last mentioned means to be effective when said body is removed from the vessel.

8. A floating safe of the character described, comprising in combination, a body, means for retaining the body on the vessel, electrical signal apparatus, a switch controlling said apparatus, time mechanism for opening and closing the switch, and means for rendering the time mechanism effective when said body leaves said retaining means.

9. A floating safe of the character described comprising in combination, a body, means for retaining the body of the vessel, electrical signal apparatus, a switch controlling said apparatus, and means for operating said switch after a predetermined period of time upon the removal of the body from said retaining means.

10. In a floating safe of the character described, in combination, a body, means for retaining the body on the vessel, signaling apparatus normally positioned within the body, means for projecting said apparatus out of said body, a locking member normally locking said projecting means against operation, time controlled means for releasing said locking means, means for locking said safe on said retaining means, means for causing said last mentioned means to release the safe when the vessel sinks, and means actuated by the releasement of said safe from said retaining means to cause said time controlled means to become effective.

11. In a device of the character described, in combination, a floating safe, locking means for retaining said safe on the deck of a vessel, means for automatically releasing said safe when the vessel sinks, signaling apparatus carried within the safe, and means for causing said apparatus to be projected from the safe when the latter is released from the vessel.

12. In a device of the characted described, in combination, a floating safe, means for retaining the safe on the deck of a vessel, said means comprising a seat, arms pivotally attached to said seat and adapted to engage the safe when the latter is positioned upon said seat, locking means normally holding one or more of said arms against rotation, an electric circuit, electro-magnetic means fed from said circuit and normally causing said locking means to be effective, said electro-magnetic means being adapted to be short-circuited by the sinking of the vessel to render said locking means inoperative and to release said safe from said seat.

13. A floating safe of the character described, comprising, in combination, a buoyant body, means for retaining said body upon the vessel, a signal apparatus comprising signal lamps, rockets and an audible signal device, said apparatus being adapted to be normally positioned within the safe, projecting means operatively connected with said signal apparatus, electric-circuits connected with each of said signals of said apparatus, means in one of said electric-circuits for normally holding said projecting means inoperative, a source of electrical supply for said circuits, a switch mechanism for opening and closing said circuits, a time controlled mechanism for opening and closing said switches, means for causing said retaining means to release said safe when the vessel sinks, and means actuated by the removal of the safe from the retaining means to cause said time-mechanism to be effective, whereby said projecting means and signal devices are operated.

14. In a device of the character described comprising, in combination, a buoyant safe, signaling apparatus normally positioned within the safe comprising signal lamps, rockets, and an audible signal device, projecting means connected with said signal apparatus, electric circuits for operating said lamps and audible signal, means in one of said circuits for normally rendering said projecting means inoperative, a source of electrical energy for said circuits, controlled means for opening and closing said circuits, a rocket discharge mechanism adapted to be energized by one of said circuits, and means carried by the safe adapted to receive Hertzian wave impulses which latter control the operation of said rocket discharging mechanism when the said mechanism is energized.

15. In a device of the character described comprising, in combination, a buoyant safe, signal rockets normally positioned within the safe, a projecting means connected with said signal rockets, an electric circuit and a source of electrical supply therefor, means in said circuit for normally rendering said projecting means inoperative, controlled means for making and breaking said circuit, rocket discharging mechanism energized by said circuit when said rockets are projected from the safe, and means carried by the safe adapted to receive Hertzian wave impulses which latter cause the said mechanism to discharge said rockets when said mechanism is energized.

In testimony whereof I have signed my name to this specification in the presence of two subscribing witnesses.

CORNELIS van BLAADEREN.

Witnesses:
A. C. HEBBARD,
J. R. CAMERON.

Copies of this patent may be obtained for five cents each, by addressing the "Commissioner of Patents, Washington, D. C."